US011972731B2

(12) United States Patent
Mi et al.

(10) Patent No.: US 11,972,731 B2
(45) Date of Patent: Apr. 30, 2024

(54) DISPLAY PANEL AND METHOD FOR ADJUSTING BRIGHTNESS THEREOF, AND DISPLAY APPARATUS

(71) Applicant: Hefei Visionox Technology Co., Ltd., Anhui (CN)

(72) Inventors: Lei Mi, Hefei (CN); Ling Wang, Hefei (CN); Cuili Gai, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/342,073

(22) Filed: Jun. 27, 2023

(65) Prior Publication Data

US 2023/0335059 A1 Oct. 19, 2023

Related U.S. Application Data

(63) Continuation of application No. PCT/CN2021/123136, filed on Oct. 11, 2021.

(30) Foreign Application Priority Data

Feb. 26, 2021 (CN) ......................... 202110217946.3

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0439* (2013.01);
(Continued)

(58) Field of Classification Search
CPC ............... G09G 3/2007; G09G 3/3233; G09G 2300/0439; G09G 2300/0819;
(Continued)

(56) References Cited

U.S. PATENT DOCUMENTS

2019/0147802 A1 5/2019 Li et al.
2021/0034191 A1 2/2021 Jia

FOREIGN PATENT DOCUMENTS

CN 109637457 A 4/2019
CN 210120137 U 2/2020
(Continued)

OTHER PUBLICATIONS

International Search Report issued on Dec. 2, 2021, in corresponding in International Application No. PCT/CN2021/123136, 5 pages.
(Continued)

*Primary Examiner* — Michael Pervan

(74) *Attorney, Agent, or Firm* — Maier & Maier, PLLC

(57) ABSTRACT

A display panel and a method for adjusting brightness thereof, and a display apparatus. The display panel includes a first and a second display area. A pixel density of the first display area is less than a pixel density of the second display area. The display panel includes a power supply unit including a power supply output terminal; first power supply lines electrically connected to sub-pixels of the first display area; second power supply lines electrically connected to sub-pixels of the second display area; and a voltage adjusting unit. First ends of the second power supply lines are electrically connected to the power supply output terminal, second ends of the second power supply lines are electrically connected to the first power supply lines via the voltage adjusting unit, and the voltage adjusting unit is configured to adjust a voltage on the first power supply lines.

20 Claims, 7 Drawing Sheets

(52) U.S. Cl.
CPC ............... *G09G 2300/0819* (2013.01); *G09G 2300/0842* (2013.01); *G09G 2310/08* (2013.01); *G09G 2320/0223* (2013.01); *G09G 2320/0233* (2013.01); *G09G 2320/0626* (2013.01); *G09G 2320/0673* (2013.01); *G09G 2330/02* (2013.01)

(58) Field of Classification Search
CPC ....... G09G 2300/0842; G09G 2310/08; G09G 2320/0223; G09G 2320/0233; G09G 2320/0626; G09G 2320/0673; G09G 2330/02
See application file for complete search history.

(56) References Cited

FOREIGN PATENT DOCUMENTS

| | | | |
|---|---|---|---|
| CN | 111414872 | A | 7/2020 |
| CN | 111445847 | A | 7/2020 |
| CN | 111445859 | A | 7/2020 |
| CN | 111768740 | A | 10/2020 |
| CN | 111833796 | A | 10/2020 |
| CN | 111863896 | A | 10/2020 |
| CN | 111653249 | A | 12/2020 |
| JP | 2001350154 | A | 12/2001 |

OTHER PUBLICATIONS

Office Action issued on Aug. 4, 2022, in corresponding Taiwan Application No. 110139358, 6 pages.

DISPLAY PANEL AND METHOD FOR ADJUSTING BRIGHTNESS THEREOF, AND DISPLAY APPARATUS

CROSS-REFERENCE TO RELATED APPLICATIONS

The present application is a continuation of International Application No. PCT/CN2021/123136 filed on Oct. 11, 2021, which claims the priority to Chinese patent application No. 202110217946.3 filed on Feb. 26, 2021, both of which are incorporated herein by reference in their entireties.

TECHNICAL FIELD

The present application belongs to the field of display, and particularly, relates to a display panel and a method for adjusting brightness thereof, and a display apparatus.

BACKGROUND

With rapid development of electronic devices, users are requiring to have higher and higher screen-to-body ratios, so that the industry has shown more and more interest in all-screen displays of electronic devices.

Currently, there has been a design of under screen camera. The under screen camera means that the camera is located under a display screen without affecting the display function of the display screen. Gamma debugging is usually performed using a white picture to ensure consistency of display brightness in the white picture of an area under which a camera is disposed and an area where no camera is disposed on the display screen. However, since there may be different currents on power supply lines in a monochrome picture and in the white picture, there may be different voltage drops (IR drops) on the power supply lines in the monochrome picture and in the white picture, leading to a problem that display brightness values of the area under which the camera is disposed and the area where no camera is disposed may be consistent in the white picture, but inconsistent in the monochrome picture.

SUMMARY

A first aspect of the present application provide a display panel. The display panel includes a first display area and a second display area. A pixel density of the first display area is less than a pixel density of the second display area. The display panel includes a plurality of sub-pixels disposed in the first display area and the second display area; a power supply unit including a power supply output terminal; a plurality of first power supply lines electrically connected to the sub-pixels disposed in the first display area; a plurality of second power supply lines electrically connected to the sub-pixels disposed in the second display area; and a voltage adjusting unit; wherein first ends of the second power supply lines are electrically connected to the power supply output terminal, second ends of the second power supply lines are electrically connected to the first power supply lines via the voltage adjusting unit, and the voltage adjusting unit is configured to adjust a voltage on the first power supply lines.

In a second aspect, an embodiment of the present application provides a method for adjusting display panel brightness, used to determine a voltage value of a control signal of the control signal terminal of the display panel according to any embodiment of the first aspect. The method includes setting the control signal of the control signal terminal to have an initial voltage value, and performing gamma debugging on the display panel, to keep brightness consistency of the first display area and the second display area in white pictures at respective gray levels; at the initial voltage value, displaying a monochrome picture of a first gray level on both the first display area and the second display area, and judging whether a brightness difference between the first display area and the second display area is within a first preset range; under a condition that the brightness difference between the first display area and the second display area is beyond the first preset range, adjusting the initial voltage value to obtain a first voltage value, at which the brightness difference between the first display area and the second display area is within the first preset range; and taking the first voltage value as the voltage value of the control signal of the control signal terminal when both the first display area and the second display area display the monochrome picture of the first gray level.

In a third aspect, an embodiment of the present application provides a display apparatus including the display panel according to any embodiment of the first aspect.

BRIEF DESCRIPTION OF THE DRAWINGS

Other features, objects, and advantages of the present application will become more apparent from the following detailed description of non-limiting embodiments with reference to the accompanied drawings, where like or similar reference numbers refer to the same or similar features. The drawings are not necessarily drawn to actual scale.

DETAILED DESCRIPTION

Features and exemplary embodiments of various aspects of the present application will be described in details below. In order to make the objects, technical solutions and advantages of the present application clearer, the present application is further described in details below with reference to the drawings and specific embodiments. It should be understood that the specific embodiments described herein are merely provided to explain the present application, rather than to limit the present application. For those skilled in the art, the present application can be implemented without some of these specific details. The following description of the embodiments is only for providing a better understanding of the present application by illustrating examples of the present application.

Figure 1:
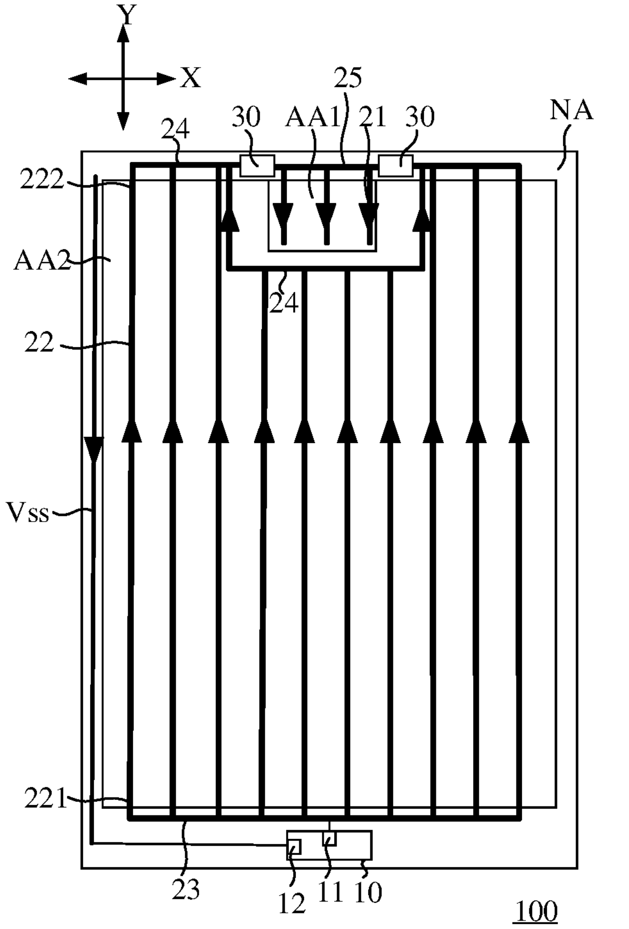
FIG. 1 shows a schematic top view of a display panel provided by an embodiment of the present application.

FIG. 1 shows a schematic top view of a display panel provided according to an embodiment of the present application. As shown in FIG. 1, the display panel 100 may include a first display area AA1 and a second display area AA2. The second display area AA2 may at least partially surround the first display area AA1. A light transmittance of the first display area AA1 is greater than a light transmittance of the second display area AA2. The display panel may be an Organic Light Emitting Diode (OLED) display panel.

Here, the light transmittance of the first display area AA1 may be greater than or equal to 15%. In order to ensure that the light transmittance of the first display area AA1 is greater than or equal to 15%, or even greater than 40% or more, light transmittances of at least some of functional film layers in the first display areas AA1 of the display panels 100 in the embodiment of the present application may be greater than 80%, or even greater than 90%.

In the display panel 100 according to the embodiment of the present application, the light transmittance of the first display area AA1 is greater than the light transmittance of the second display area AA2, so that photosensitive components may be integrated on the back of the first display area AA1 of the display panel 100 to achieve under-screen integration of the photosensitive components such as cameras, while the first display area AA1 can display pictures. Thus, a display area of the display panel 100 can be increased and a full-screen design of a display apparatus can be realized.

The display panel 100 may include a power supply unit 10, first power supply lines (Vdd lines) 21, second power supply lines 22, and a voltage adjusting unit 30. Further, both the first display area AA1 and the second display area AA2 of the display panel 100 are provided with sub-pixels (not shown).

In order to improve the light transmittance of the first display area AA1, a pixel density (such as, Pixels Per Inch (PPI)) of the first display area AA1 is generally set to be smaller than a pixel density of the second display area AA2. Since the pixel density of the first display area AA1 is relatively smaller, in order to ensure the brightness consistency of the first display area AA1 and the second display area AA2 when displaying the same picture, brightness of a single sub-pixel in the first display area AA1 can be controlled to be greater than brightness of a single sub-pixel in the second display area AA2, for example, a data voltage of the single sub-pixel in the first display area AA1 can be controlled to be lower than a data voltage of the single sub-pixel in the second display area AA2, so as to achieve the purpose that the brightness of the single sub-pixel in the first display area AA1 is greater than the brightness of the single sub-pixel in the second display area AA2.

After gamma debugging has been performed for the display panel using a white picture, the first display area AA1 and the second display area AA2 may have consistent display brightness in the white picture. Since sub-pixels of all colors should be illuminated in the white picture, while only sub-pixels of a single color need to be illuminated in a monochrome picture, currents on the second power supply lines 22 are different in the monochrome picture and the white picture, and thereby voltage drops on the second power supply lines 22 are also different in the monochrome picture and the white picture, resulting in a problem that the display brightness values of the first display area AA1 and the second display area AA2 are consistent in the white picture but inconsistent in the monochrome picture.

The embodiment of the present application further includes the voltage adjusting unit 30, which can be configured to adjust the voltage on the first power supply lines 21.

In some embodiments, the display panel 100 may further include a non-display area NA. The power supply unit 10 and the voltage adjusting unit 30 may both be provided in the non-display area NA.

Illustratively, the power supply unit 10 may be an integrated circuit (IC). The power supply unit 10 may be bound to the display panel via a Flexible Printed Circuit (FPC), which is not limited herein. The power supply unit 10 may include a power supply output terminal 11.

The first power supply lines 21 may be electrically connected to the sub-pixels disposed in the first display area AA1, and the second power supply lines 22 may be electrically connected to the sub-pixels disposed in the second display area AA2. Illustratively, the ends of the second power supply lines 22 that are close to the power supply unit 10 are first ends 221 of the second power supply lines 22, and the ends of the second power supply lines 22 that are far away from the power supply unit 10 are second ends 222 of the second power supply lines 22. The first ends 221 of the second power supply lines 22 are electrically connected to the power supply output terminal 11, and the second ends 222 of the second power supply lines 22 are electrically connected to the first power supply lines 21 via the voltage adjusting unit 30.

According to the embodiments of the present application, on one hand, as compared with the first power supply lines 21 and the second power supply lines 22 being electrically connected to different power supply output terminals, the first power supply lines 21 and second power supply lines 22 in the embodiments of the present application are electrically connected to the same power supply output terminal, so as to simplify the structure of the power supply unit 10; on the other hand, the voltage adjusting unit 30 is provided, which can adjust the voltage on the first power supply lines 21, i.e., handle the voltage on the first power supply lines 21 to provide the voltage required when the first display area displays the monochrome picture, so that the problem that the display brightness values of the first display area AA1 and the second display area AA2 are consistent in the white picture but inconsistent in the monochrome picture caused by different voltage drops of the second power supply lines 22 in the white picture and the monochrome picture can be avoided, and the brightness consistency of the first display area AA1 and the second display area AA2 of the display panel in the monochrome picture can be improved.

Illustratively, the first power supply lines 21 may include a plurality of first power supply lines that are spaced apart in a first direction X and all extend along a second direction Y. Further, the second power supply lines 22 may include a plurality of second power supply lines that are spaced apart in the first direction X and all extend along the second direction Y. The first direction X intersects the second direction Y. For example, the first direction X may be perpendicular to the second direction Y, and the first direction X may be a row direction and the second direction Y may be a column direction, which is not limited herein.

Illustratively, the first end 221 of each of the second power supply lines 22 may be connected to a first connecting line 23, and the second end 222 of each of the second power supply lines 22 may be connected to a second connecting line 24. For example, as shown in FIG. 1, the second power supply lines 22 directly facing the first display area AA1 in the second direction Y and the second power supply lines 22 on both sides of the first display area AA1 in the first direction X are all connected to the voltage adjusting unit 30 through the second connecting line 24. It may be understood as that the plurality of second power supply lines 22 are connected in parallel between the power supply output terminal 11 and the voltage adjusting unit 30. In addition, the voltage adjusting unit 30 may be electrically connected to each of the first power supply lines 21 through a third connecting line 25. That is to say, an end of each of the first power supply lines 21 is connected to the third connecting line 25. There may be two voltage adjusting units 30. One of the voltage adjusting units 30 may be connected to an end of the third connecting line 25, and the other one may be connected to the other end of the third connecting line 25. There may be the same number of second power supply lines 22 being connected to either of the two voltage adjusting units 30. It will be appreciated that the voltages output by the two voltage adjusting units 30 are equal. In addition, the size of the first display area is usually much smaller than the size of the second display area, and thus the first power supply lines 21 and the third connecting line 25 are relatively short, and voltage drops on the first power supply lines 21 and the third connecting line 25 may be negligible. That is, the potential at each position on the first power supply lines 21 and the third connecting line 25 can be considered to be the same.

Illustratively, as shown in FIG. 1, the display panel may further include a power supply line Vss located at the non-display area, the power supply unit 10 may further include a power supply output terminal 12, and the power supply line Vss is electrically connected to the power supply output terminal 12. The power supply output terminal 11 provides a positive voltage and the power supply output terminal 12 provides a negative voltage. The power supply line Vss is electrically connected to cathodes of the sub-pixels of the display panel (not shown). The current direction of the display panel may be as shown by arrows in FIG. 1. Currents flow from the second power supply lines 22 to the first power supply lines 21 through the voltage adjusting unit 30, and the currents on the second power supply lines 22 flow to the power supply line Vss through the sub-pixels in the second display area, and currents on the first power supply lines 21 flow to the power supply line Vss through the sub-pixels in the first display area.

In FIG. 1, the second power supply lines 22 directly facing the first display area AA1 in the second direction Y are connected to the voltage adjusting unit(s) 30. It will be appreciated that the currents on the second power supply lines 22 directly facing the first display area AA1 in the second direction Y will also flow to the voltage adjusting unit(s) 30. Of course, FIG. 1 is merely an example, and it is also possible to arrange that a part of the second power supply lines 22 are connected to the voltage adjusting unit(s) 30 and another part of the second power supply lines 22 are not connected to the voltage adjusting unit(s) 30. In that case, currents on the second power supply lines 22 that are connected to the voltage adjusting unit(s) 30 flow to the voltage adjusting unit 30, and currents on the second power supply lines 22 that are not connected to the voltage adjusting unit(s) 30 do not flow to the voltage adjusting unit 30. The number of second power supply lines 22 that connected to the voltage adjusting unit(s) 30 is not limited herein.

Figure 2:
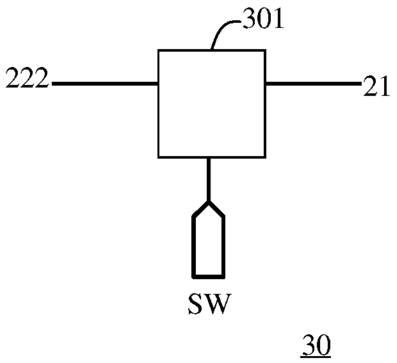
FIG. 2 shows a schematic structure diagram of a voltage adjusting unit provided by an embodiment of the present application.

In some alternative embodiments, as shown in FIG. 2, the voltage adjusting unit 30 may include a driving module 301. A control terminal of the driving module 301 may be electrically connected to a control signal terminal SW, an input terminal of the driving module 301 may be electrically connected to the second ends 222 of the second power supply lines 22, and an output terminal of the driving module 301 may be electrically connected to the first power supply lines 21. The control signal terminal SW may be referred to as a Switch terminal.

Illustratively, the voltage on the first power supply lines 21 may be adjusted by setting a voltage magnitude of a control signal output from the control signal terminal SW, so as to control the brightness of the first display area AA1. The control signal terminal SW may be integrated on a driving chip of the display panel 100, which is not limited herein.

According to embodiments of the present application, the voltage on the first power supply lines 21 can be adjusted by merely providing the driving module 301, which is simple and convenient.

Figure 3:
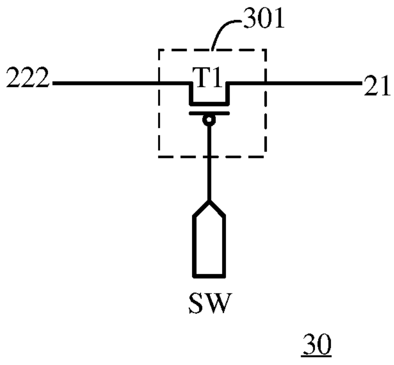
FIG. 3 shows a schematic structure diagram of a voltage adjusting unit provided by another embodiment of the present application.

In some alternative embodiments, as shown in FIG. 3, the driving module 301 may include a first transistor T1. A gate electrode of the first transistor T1 may be electrically connected to the control signal terminal SW, a first electrode of the first transistor T1 may be electrically connected to the second ends 222 of the second power supply lines 22, and a second electrode of the first transistor T1 may be electrically connected to the first power supply lines 21. That is to say, the first electrode of the first transistor T1 is the input terminal of the driving module 301, and the second electrode of the first transistor T1 is the output terminal of the driving module 301.

Figure 4:
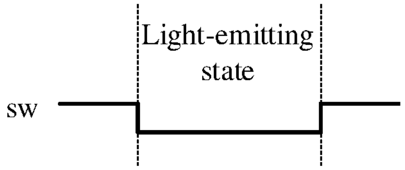
FIG. 4 shows a schematic timing diagram of FIG. 3.

Illustratively, the first transistor T1 may be a P-type transistor or an N-type transistor. It is taken as an example that the first transistor T1 is the P-type transistor. As shown in FIG. 4, when the second display area AA2 is in a light-emitting state, the control signal sw output by the control signal terminal SW should be at a low level to ensure that the first transistor T1 is turned on, so as to enable the sub-pixels in the first display area AA1 to emit light.

According to the embodiments of the present application, the voltage on the first power supply lines 21 can be adjusted by merely providing one transistor, which is relatively simple in structure; and the display brightness of the first display area AA1 can be adjusted by merely adjusting the voltage magnitude output by the control signal terminal SW, which is also relatively simple in implementation.

Figure 5:
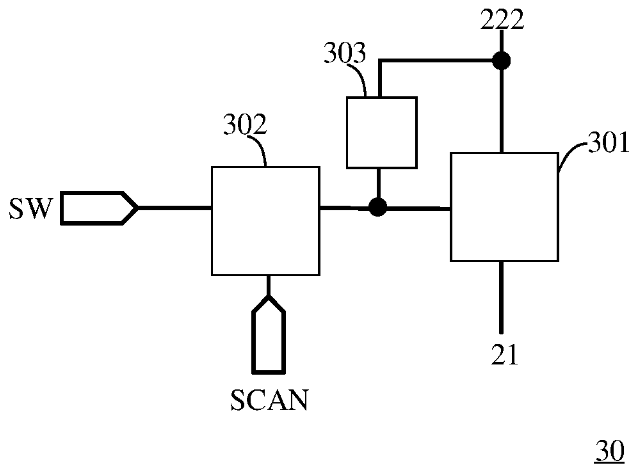
FIG. 5 shows a schematic structure diagram of a voltage adjusting unit provided by another embodiment of the present application.

In some optional embodiments, as shown in FIG. 5, the voltage adjusting unit 30 further includes a first control signal writing module 302 and a first storage module 303. The first control signal writing module 302 may be electrically connected to the control terminal of the driving module 301 and the control signal terminal SW, and configured to write the control signal of the control signal terminal SW into the control terminal of the driving module 301. The first storage module 303 may be electrically connected to the control terminal of the driving module 301, and configured to maintain potential of the control terminal of the driving module 301.

The time when the control signal of the control signal terminal SW is written into the control terminal of the driving module 301 can be controlled by providing the first control signal writing module 302, and the potential of the control terminal of the driving module 301 can be maintained to be more stable by providing the first storage module 303.

Figure 6:
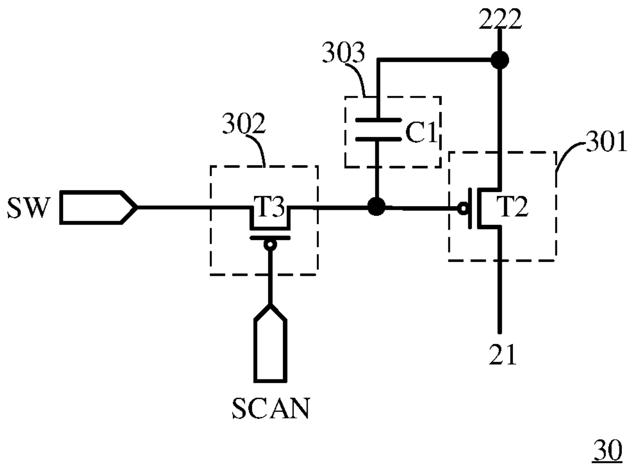
FIG. 6 shows a schematic structure diagram of a voltage adjusting unit provided by another embodiment of the present application.

In some optional embodiments, as shown in FIG. 6, the driving module 301 includes a second transistor T2, the first control signal writing module 302 may include a third transistor T3, and the first storage module 303 may include a first capacitor C1. A first electrode of the second transistor T2 may be electrically connected to the second ends 222 of the second power supply lines 22, and a second electrode of the second transistor T2 may be electrically connected to the first power supply lines 21. A gate electrode of the third transistor T3 may be electrically connected to a scanning signal terminal SCAN, a first electrode of the third transistor T3 may be electrically connected to the control signal terminal SW, and a second electrode of the third transistor T3 may be electrically connected to a gate electrode of the second transistor T2. A first pole of the first capacitor C1 may be electrically connected to the second ends 222 of the second power supply lines 22, and a second pole of the first capacitor C1 may be electrically connected to the gate electrode of the second transistor T2.

Figure 7:
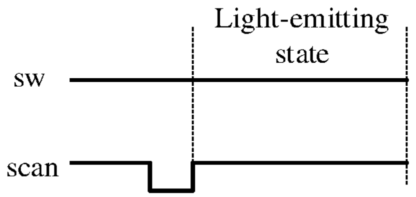
FIG. 7 shows a schematic timing diagram of FIG. 6.

The second transistor T2 and the third transistor T3 may be a P-type transistor or an N-type transistor. It is taken as an example that the second transistor T2 and the third transistor T3 are P-type transistors. As shown in FIG. 7, before the second display area AA2 displays each frame of picture, i.e., before the second display area AA2 is in a display state, a scanning signal "scan" output by the scanning signal terminal SCAN is at a low level, so that the third transistor T3 is turned on and the control signal sw output by the control signal terminal SW is written into the gate electrode of the second transistor T2.

Figure 8:
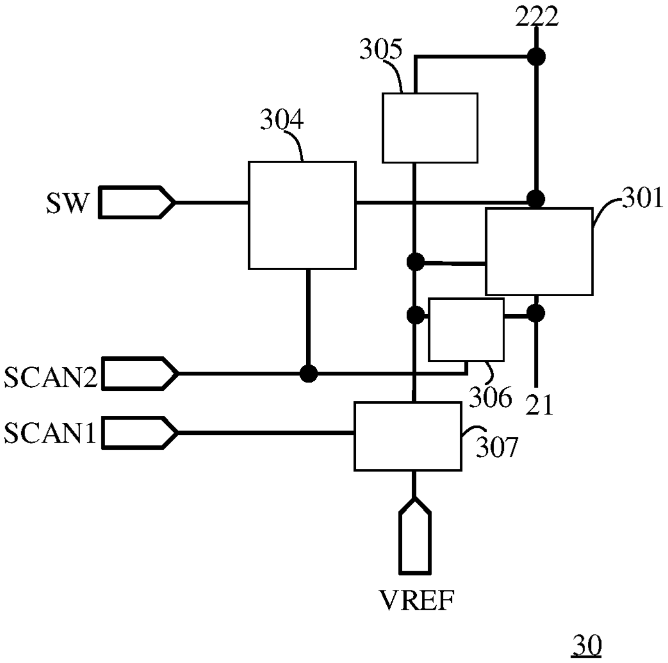
FIG. 8 shows a schematic structure diagram of a voltage adjusting unit provided by another embodiment of the present application.

In some optional embodiments, as shown in FIG. 8, the voltage adjusting unit 30 further includes a second control signal writing module 304, a compensation module 306, an initialization module 307, and a second storage module 305. The second control signal writing module 304 may be electrically connected to the input terminal of the driving module 301 and the control signal terminal SW, and configured to write a control signal of the control signal terminal SW into the control terminal of the driving module 301. The compensation module 306 may be electrically connected to the output terminal and the control terminal of the driving module 301, and configured to detect and self-compensate a threshold voltage deviation in the driving module 301. The initialization module 307 may be electrically connected to the control terminal of the driving module 301 and a reference signal terminal VREF, and configured to initialize the control terminal of the driving module 301. The second storage module 305 may be electrically connected to the control terminal of the driving module 301, and configured to maintain potential of the control terminal of the driving module 301.

According to the embodiments of the present application, by providing the compensation module 306, it is possible to prevent the voltage on the first power supply lines 21 from being affected by the threshold voltage in the driving module; by providing the initialization module 307, it is possible to avoid the potential of the control terminal of the driving module in a previous frame to affect the potential of a following frame.

Figure 9:
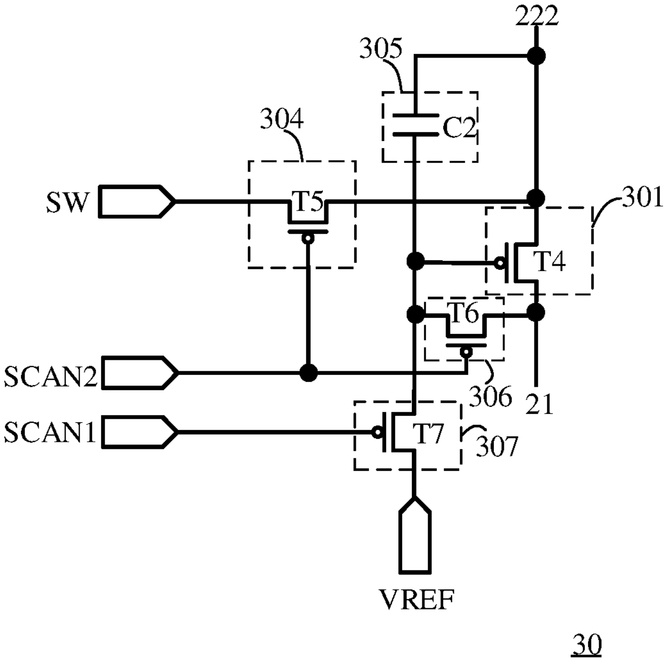
FIG. 9 shows a schematic structure diagram of a voltage adjusting unit provided by another embodiment of the present application.

In some alternative embodiments, as shown in FIG. 9, the drive module 301 may include a fourth transistor T4, the second control signal writing module 304 may include a fifth transistor T5, the compensation module 306 may include a sixth transistor T6, the initialization module 307 may include a seventh transistor T7, and the second storage module 305 may include a second capacitor C2.

A first electrode of the fourth transistor T4 may be electrically connected to the second ends 222 of the second power supply lines 22, and a second electrode of the fourth transistor T4 may be electrically connected to the first power supply lines 21. A gate electrode of the fifth transistor T5 may be electrically connected to a second scanning signal terminal SCAN2, a first electrode of the fifth transistor T5 may be electrically connected to the control signal terminal SW, and a second electrode of the fifth transistor T5 may be electrically connected to the first electrode of the fourth transistor T4. A gate electrode of the sixth transistor T6 may be electrically connected to the second scanning signal terminal SCAN2, a first electrode of the sixth transistor T6 may be electrically connected to the second electrode of the fourth transistor T4, and a second electrode of the sixth transistor T6 may be electrically connected to the gate electrode of the fourth transistor T4. A gate electrode of the seventh transistor T7 may be electrically connected to a first scanning signal terminal SCAN1, a first electrode of the seventh transistor T7 may be electrically connected to the reference signal terminal VREF, and a second electrode of the seventh transistor T7 may be electrically connected to the gate electrode of the fourth transistor T4. A first pole of the second capacitor C2 may be electrically connected to the second ends 222 of the second power supply lines 22, and a second pole of the second capacitor C2 may be electrically connected to the gate electrode of the fourth transistor T4.

Figure 10:
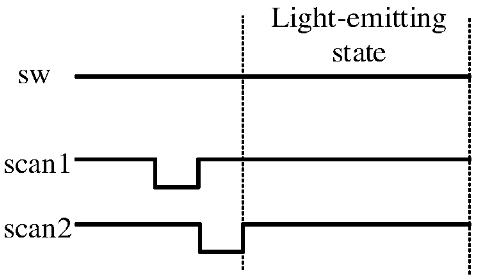
FIG. 10 shows a schematic timing diagram of FIG. 6.

Each of the fourth transistor T4 to the seventh transistor T7 may be a P-type transistor or an N-type transistor. It is taken as an example that the fourth transistor T4 to the seventh transistor T7 are P-type transistors. As shown in FIG. 10, before the second display area AA2 displays each frame of picture, i.e., before the second display area AA2 is in a display state, the scanning signal scan1 output by the first scanning signal terminal SCAN1 is at a low level, and thereby the seventh transistor T7 is turned on, so as to initialize the gate electrode of the fourth transistor T4; and in turn, the scanning signal scan2 output by the second scanning signal terminal SCAN2 is at the low level, and thereby the fifth transistor T5 and the sixth transistor T6 are turned on, and the control signal sw outputted from the control signal terminal SW is written to the gate electrode of the fourth transistor T4, resulting in a final voltage of the gate electrode of the fourth transistor T4 to be sw+Vth, where Vth is a threshold voltage of the fourth transistor T4.

In the schematic structure diagrams shown in FIGS. 3, 6 and 9, the first transistor T1, the second transistor T2 and the fourth transistor T4 are all driving transistors, and an on-state current of each of the first transistor T1, the second transistor T2 and the fourth transistor T4 is greater than the maximum light-emitting current of the first display area AA1.

Figure 11:
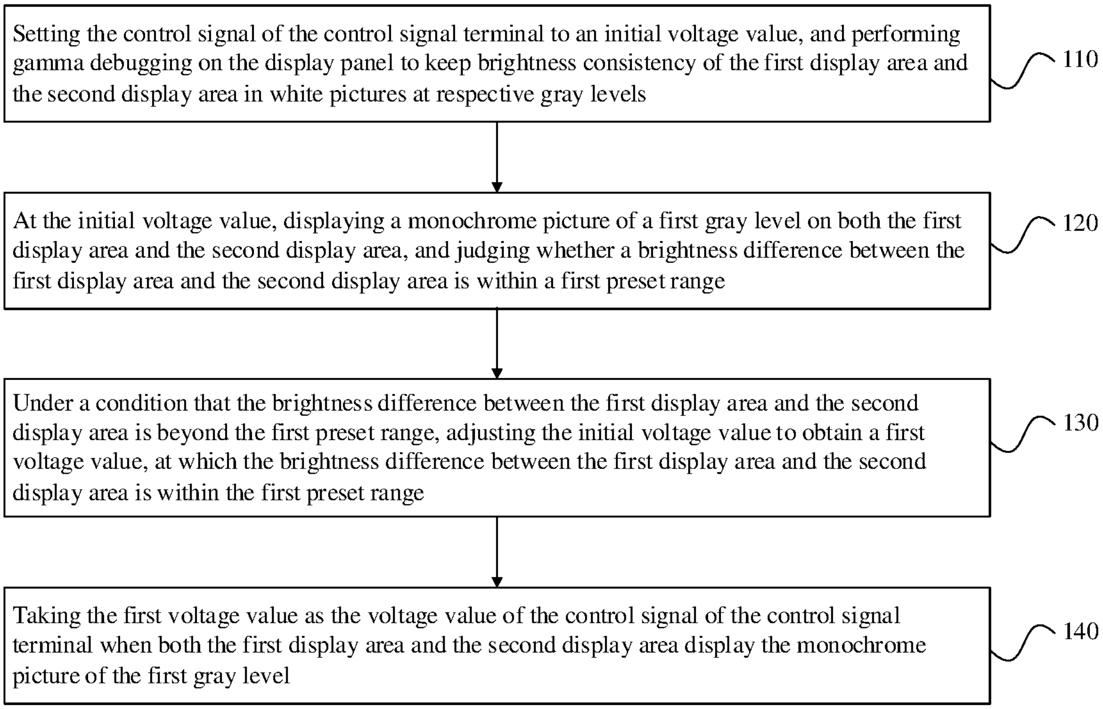
FIG. 11 shows a schematic flowchart of a method for adjusting display panel brightness provided by an embodiment of the present application.

An embodiment of the present application further provide a method for adjusting display panel brightness, which can be to determine a voltage value of the control signal of the control signal terminal SW of the display panel according to any of the above embodiments. As shown in FIG. 11, the method for adjusting display panel brightness provided by the embodiment of the present application includes steps 110 to 140.

At step 110, the control signal of the control signal terminal is set to have an initial voltage value, and gamma debugging is performed on the display panel to keep brightness consistency of the first display area and the second display area in white pictures at respective gray levels.

At step 120, at the initial voltage value, a monochrome picture of a first gray level is displayed on both the first display area and the second display area, and it is judged whether a brightness difference between the first display area and the second display area is within a first preset range.

At step 130, under a condition that the brightness difference between the first display area and the second display area is beyond the first preset range, the initial voltage value is adjusted to obtain a first voltage value, at which the brightness difference between the first display area and the second display area is within the first preset range.

At step 140, the first voltage value is taken as the voltage value of the control signal of the control signal terminal when both the first display area and the second display area display the monochrome picture of the first gray level.

According to the embodiment of the present application, the voltage value of the control signal at the control signal terminal required when the first display area and the second display area display the same first gray level picture can be determined accurately, so that when the display panel actually displays the same first gray level picture, the problem that the display brightness values of the first display area and the second display area are consistent in the white picture but inconsistent in the monochrome picture caused by different voltage drops of the second power supply lines in the white picture and the monochrome picture can be avoided, and the brightness consistency of the first display area and the second display area of the display panel in the monochrome picture can be improved.

Illustratively, the initial voltage value at step 110 may be −7V. Two gamma curves can be used to perform gamma debugging on the first display area and the second display area of the display panel in the white picture of the same gray level. For example, when the display panel displays a gray level range of gray levels 0-255, the first display area and the second display area of the display panel can both display a white picture of the gray level 255, gray level 128, gray level 96, gray level 64, gray level 32 or another gray level, and the display brightness values of the first display area and the second display area are consistent, so as to determine a corresponding data voltage value (Vdata) of the first display area and the second display area in the range of gray levels 0-255.

The initial voltage value may be set according to the actual situation and is not limited to −7V.

Illustratively, the monochrome picture of the first gray level may be a red picture of the first gray level, a green picture of the first gray level or a blue picture of the first gray level. The first gray level may be any one of the gray levels 0-255. For example, if the first gray level is the gray level 255, at step 120, the corresponding data voltage of the first display area and the second display area at the gray level determined at step 110 may be provided to the first display area and the second display area. It can be understood that the present application firstly determines the data voltage value of the first display area and the second display area at each gray level, then keeps the data voltage value unchanged, and adjusts the voltage value of the control signal at the control signal terminal, so as to adjust the brightness of the first display area at each gray level.

Illustratively, the first preset range may be determined based on a difference in brightness that can be recognized by human eyes, which is not limited herein.

In addition, it can be understood that at steps 130 and 140, if the brightness difference between the first display area and the second display area is within the first preset range, the initial voltage value need not be adjusted, and the initial voltage value can be directly used as the voltage value of the control signal of the control signal terminal when both the first display area and the second display area display the monochrome picture of the first gray level.

The applicant of the present application also finds that, for example, in a case where a picture displayed on the first display area is always the same and a picture displayed on the second display area changes continuously, the current of the second display area changes continuously, i.e., the voltage drop of the second power supply lines changes continuously, since the picture displayed on the second display area changes continuously, so that the current of the first display area also changes with the change of the voltage drop of the second power supply lines, resulting in unstable brightness of the first display area, for example, the first display area may suffer from a flashing screen problem.

Figure 12:
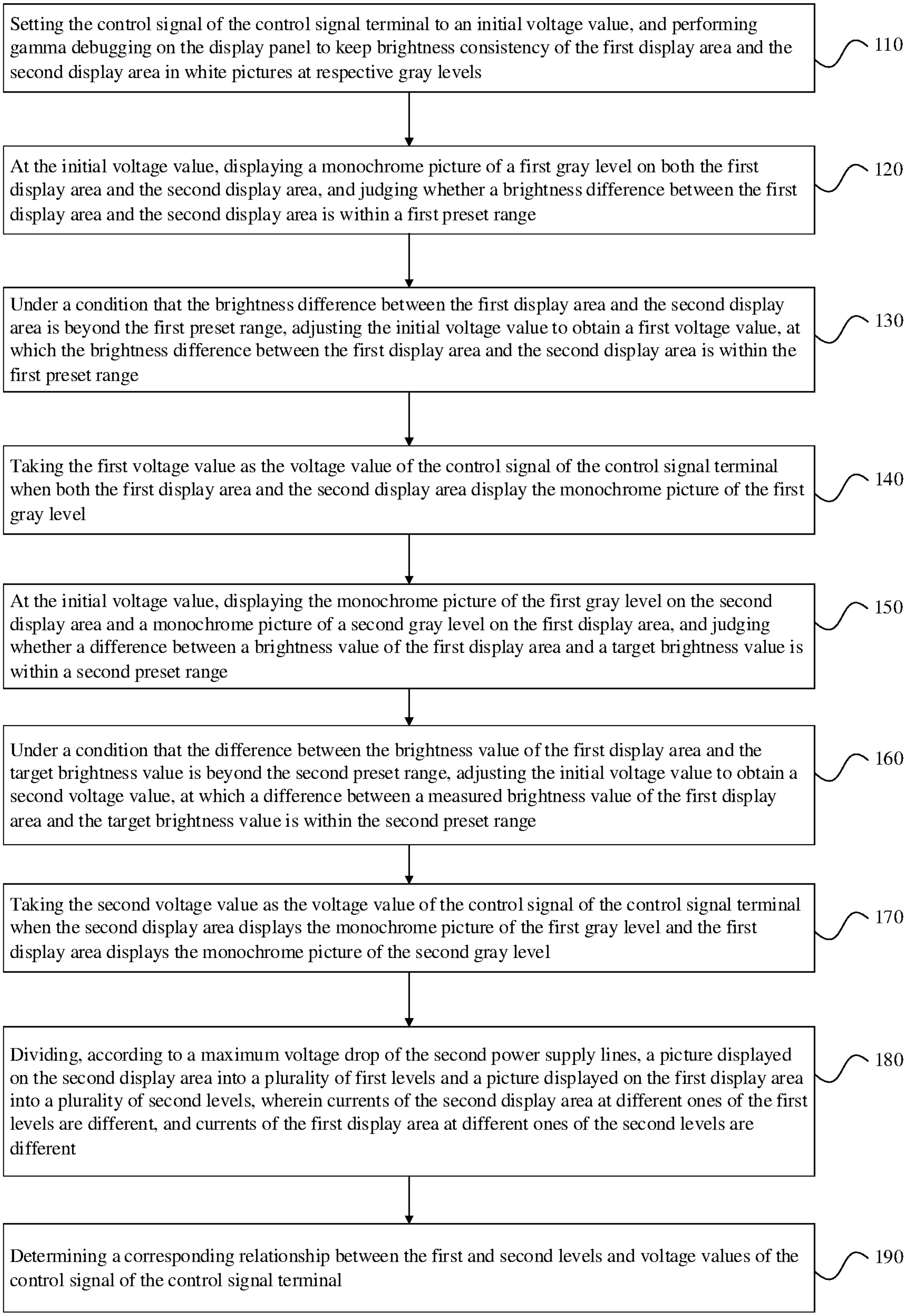
FIG. 12 shows a schematic flowchart of a method for adjusting display panel brightness provided by another embodiment of the present application.

To this end, in some optional embodiments, as shown in FIG. 12, method for adjusting display panel brightness provided by the embodiment of the present application may further includes steps 150 to 170.

At step 150, at the initial voltage value, the monochrome picture of the first gray level is displayed on the second display area and a monochrome picture of a second gray level is displayed on the first display area, and it is judged whether a difference between a brightness value of the first display area and a target brightness value is within a second preset range.

At step 160, under a condition that the difference between the brightness value of the first display area and the target brightness value is beyond the second preset range, the initial voltage value is adjusted to obtain a second voltage value, at which a difference between a measured brightness value of the first display area and the target brightness value is within the second preset range.

At step 170, the second voltage value is taken as the voltage value of the control signal of the control signal terminal when the second display area displays the monochrome picture of the first gray level and the first display area displays the monochrome picture of the second gray level.

According to the embodiment of the present application, the voltage value of the control signal of the control signal terminal required when the first display area and the second display area display different pictures can be determined accurately, so that when the first display area and the second display area of the display panel actually display different pictures, the brightness of the first display area can be prevented from changing due to different voltage drops on the first power supply lines, so as to improve the stability of the display brightness of the first display area, and protect the first display area from the flashing screen problem.

At step 150, the first and second gray levels may be any one of the gray levels 0-255, and it is to be understood that the first gray level is different from the second gray level. For example, the first gray level may be the gray level 255, and the second gray level may be any one of gray levels 0-255 other than the gray level 255.

At step 160, the target brightness value is a theoretical brightness value corresponding to the first display area at the first gray level.

In addition, the second preset range can be determined according to a brightness difference that can be recognized by human eyes, and is not limited herein.

It will be appreciated that, at steps 160 and 170, if the difference between the measured brightness value of the first display area and the target brightness value is within the second preset range, the initial voltage value need not be adjusted, and the initial voltage value can be directly used as the voltage value of the control signal of the control signal terminal when the second display area displays the monochrome picture of the first gray level on and the first display area displays the monochrome picture of the second gray level.

In practical use of the display panel, the display panel can display various pictures, and the first display area and the second display area of the display panel display not only monochrome pictures, but also non-monochrome pictures. After the display panel is manufactured, the resistance of the second power supply lines is constant, but the current of the second display area will change with the change of the displayed pictures, so that the voltage drop of the second power supply lines will also change, and the brightness of the first display area is unstable since the voltage drop of the second power supply lines is different when different pictures are displayed.

In this regard, in some optional embodiments, as further shown in FIG. 12, the method for adjusting display panel brightness provided by the embodiment of the present application may further include steps 180 to 190.

At step 180, according to a maximum voltage drop of the second power supply lines, a picture displayed on the second display area is divided into a plurality of first levels and a picture displayed on the first display area is divided into a plurality of second levels. Currents of the second display area at different ones of the first levels are different, and currents of the first display area at different ones of the second levels are different.

At step 190, a corresponding relationship between the first and second levels and voltage values of the control signal of the control signal terminal is determined.

At step 180, illustratively, the maximum voltage drop of the second power supply lines may be simulated based on the required maximum brightness of the second display area. For example, if the maximum voltage drop of the second power supply lines is 100 mV, and the human eyes cannot recognize the brightness variation of the first display area, for example, within a voltage drop range of 5 mV, 100 mV may be equally divided on the basis of 5 mV into 20 equal parts, i.e., the number of the first levels is 20. For example, a voltage drop range of 95 mV-100 mV may correspond to a first one of the first levels and the second display area may be referred to as a main screen, the one of the first levels may be referred to as a main screen G1 level, and in a similar fashion, a voltage drop range of 0-5 mV may correspond to the twentieth one of the first levels, i.e., a main screen G20 level.

Of course, the voltage drop of the second power supply lines may also be divided non-equally, which is not limited herein.

It is to be understood that the maximum voltage drop of the second power supply lines is obtained on the basis of the current of the second display area, and therefore, when the voltage drop ranges corresponding to respective first levels are different, current ranges corresponding to respective first levels are also different, and the current ranges corresponding to respective first levels and current ranges corresponding to respective second levels can be set in advance. For example, at the main screen G1 level, the current range corresponding to the second display area may be 290 mA-300 mA; this current range corresponds to monochrome pictures and non-monochrome pictures, and for example, the current range of monochrome pictures of gray levels 250-255 is within this current range. That is to say, the gray level range corresponding to the main screen G1 level may be gray levels 250-255. In order to improve the efficiency for determining the voltage value of the control signal, the required voltage value of the control signal may be determined only in a monochrome picture.

In addition, the first display area may be referred to as a secondary screen, and for example, the number of the second levels is also 20, so the first display area may correspond to a secondary screen G1 level to a secondary screen G20 level. The gray level range corresponding to each of the second levels may be set according to actual situations, which is not limited herein.

As a specific example, the initial voltage value of the control signal output from the control signal terminal is −7V. As shown in Table 1, the first display area corresponds to the secondary screen G1 level to the secondary screen G20 level, and the second display area corresponds to the main screen G1 level to the main screen G20 level. For example, the gray level range corresponding to the main screen G1 level may include the gray levels 250-255, and the gray level range corresponding to the secondary screen G1 level may include the gray levels 249-255. The second display area may display a monochrome picture of any one of the gray levels 250-255, and the first display area may display a monochrome picture of the gray level 255, a monochrome picture of the gray level 254, . . . , and a monochrome picture of the gray level 249 in sequence. For example, if a difference between the measured brightness value of the first display area when displaying a monochrome picture of each of the gray levels 255 to 250 and a corresponding one of target brightness values corresponding to the gray levels 255 to 250 is within the second preset range, it indicates that the initial voltage value −7V can meet the requirements, and if a difference between the measured brightness value of the first display area when displaying a monochrome picture of the gray level 249 and the target brightness value corresponding to the gray level 249 is beyond the second preset range, it indicates that the initial voltage value −7V cannot meet the requirements, and the initial voltage value is to be adjusted, and the adjusted initial voltage value is denoted as sw-1-1. When a picture displayed in the second display area is at the main screen G1 level, a picture displayed in the first display area is at the secondary screen G1 level, and the control signal output by the control signal terminal is sw-1-1, the display brightness of the first display area is relatively stable. The control signals sw-1-2 to sw-1-20 output by the control signal terminal corresponding to the main screen G1 level and the secondary screen G2 level to the secondary screen G20 level may be determined sequentially in the manner described above.

Similarly, for example, the gray level range corresponding to the main screen G2 level may be the gray levels 245-249, and the second display area can display a monochrome picture of any one of the gray levels of 245-249. Control signals sw-2-1 to sw-2-20 output by the control signal terminal corresponding to the secondary screen G1 level to the secondary screen G20 level may be determined sequentially in the manner described above. Of course, it is possible to sequentially determine control signals sw-3-1 to sw-20-20 output from the control signal terminal corresponding to the main screen G3 level to the main screen G20 level and the secondary screen G1 level to the secondary screen G20 level in the manner described above.

TABLE 1

| | Secondary screen G1 level 1 | Secondary screen G2 level | Secondary screen G3 level | . . . | Secondary screen G18 level | Secondary screen G19 level | Secondary screen G20 level |
|---|---|---|---|---|---|---|---|
| Main screen G1 level | sw-1-1 | sw-1-2 | sw-1-3 | . . . | sw-1-18 | sw-1-19 | sw-1-20 |
| Main screen G2 level | sw-2-1 | sw-2-2 | sw-2-3 | . . . | sw-2-18 | sw-2-19 | sw-2-20 |
| Main screen G3 level | sw-3-1 | sw-3-2 | sw-3-3 | . . . | sw-3-18 | sw-3-19 | sw-3-20 |
| . . . | . . . | . . . | . . . | . . . | . . . | . . . | . . . |
| Main screen G18 level | sw-18-1 | sw-18-2 | sw-18-3 | . . . | sw-18-18 | sw-18-19 | sw-18-20 |
| Main screen G19 level | sw-19-1 | sw-19-2 | sw-19-3 | . . . | sw-19-18 | sw-19-19 | sw-19-20 |
| Main screen G20 level | sw-20-1 | sw-20-2 | sw-20-3 | . . . | sw-20-18 | sw-20-19 | sw-20-20 |

Though both the first display area and the second display area are divided into 20 levels in the above example, in order to improve the debugging efficiency, the first display area and the second display area can be divided into less levels, which is not limited herein.

Illustratively, it is relatively redundant in time if the debugging is performed for each gray level in a gray level range corresponding to each of the second levels of the first display area, and thus several gray level binding points can be set, for example, 5-20 gray level binding points. Illustratively, the number of the second levels is 20, and a gray level picture for each second level is selected for debugging, so as to satisfy the brightness requirements of the first display area under most gray levels as much as possible on the basis of reduced debugging time.

Illustratively, after step 190, the method for adjusting display panel brightness provided by the embodiment of the present application may further include storing the corresponding relationship between the first and second levels and the voltage values of the control signal of the control signal terminal in a storage module of the display panel.

Illustratively, a driving chip of the display panel may have a picture classification function. For example, after receiving a picture to be displayed, the driving chip of the display panel can calculate a current corresponding to the first display area and a current corresponding to the second display area, determine a specific second level from the plurality of second levels (for example, the secondary screen G1 level to the secondary screen G20 level) corresponding to the first display area according to the current corresponding to the first display area, and determine a specific first level from the plurality of first levels (for example, the main screen G1 level to the main screen G20 level) corresponding to the second display area according to the current corresponding to the second display area, and further determine the required voltage value of the control signal of the control signal terminal, according to the corresponding relationship between the first and second levels and voltage values of the control signal of the control signal terminal, to ensure the accuracy of the display brightness of the first display region.

Figure 13:
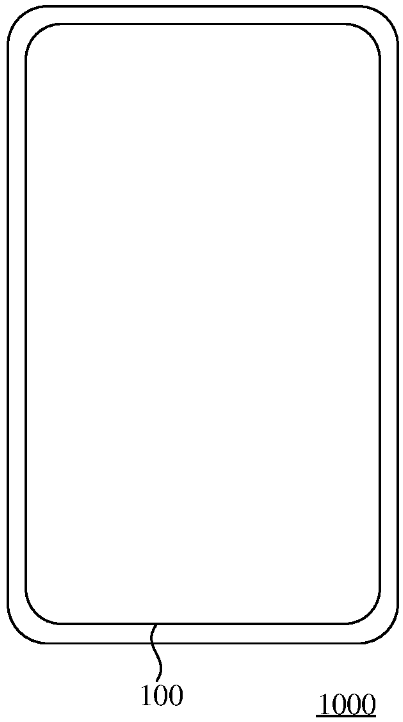
FIG. 13 shows a schematic structure diagram of a display apparatus provided by an embodiment of the present application.

The present application also provides a display apparatus including the display panel provided by the present application. Reference is now made to FIG. 13, which is a schematic structure diagram of a display apparatus provided by an embodiment of the present application. The display apparatus 1000 provided by FIG. 13 includes the display panel 100 provided by any one of the above embodiments. In the embodiment of FIG. 13, the display apparatus 1000 is described by taking a mobile phone as an example. It can be understood that the display apparatus provided by the embodiment of the present application can be another display apparatus with a display function, such as a wearable product, a computer, a television a vehicle-mounted display apparatus, and the like, which is not particularly limited herein. The display apparatus provided by the embodiment of the present application can exhibit the advantageous effects of the display panel provided by the embodiment of the present application, for which, reference can be made to the detailed description of the display panel in the above embodiments and will not be described in details herein.

Figure 14:
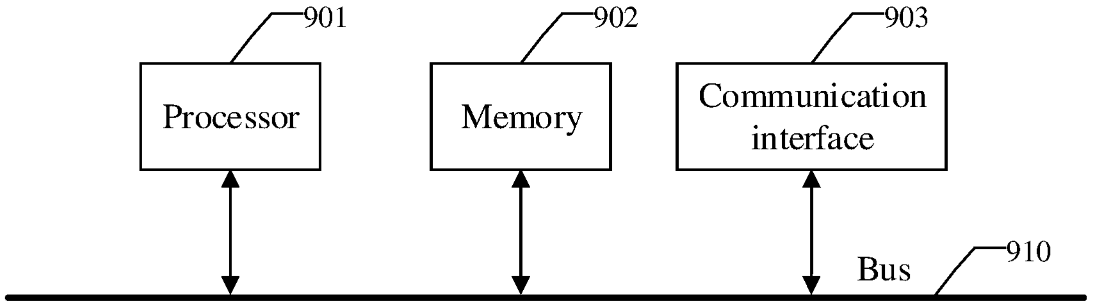
FIG. 14 is shows a schematic structure diagram of a device for adjusting display panel brightness provided by an embodiment of the present application.

FIG. 14 is shows a schematic hardware structure diagram of a device for adjusting display panel brightness provided by an embodiment of the present application.

The device for adjusting display panel brightness may include a processor 901 and a memory 902 having computer program instructions stored thereon.

In particular, the processor 901 described above may include a Central Processing Unit (CPU), or an Application Specific Integrated Circuit (ASIC), or one or more integrated circuits that can be configured to implement embodiments of the present application.

The memory 902 may include a mass storage for data or instructions. By way of example and not limitation, the memory 902 may include a Hard Disk Drive (HDD), a floppy disk drive, a flash memory, an optical disk, a magneto-optical disk, a magnetic tape, or a Universal Serial Bus (USB) drive, or a combination of two or more of the them. Where appropriate, the memory 902 may include a removable or non-removable (or fixed) medium. Where appropriate, the memory 902 may be inside or outside an integrated gateway disaster tolerance device. In a particular embodiment, the memory 902 is a non-volatile solid-state memory. In a particular embodiment, the memory 902 may include a read only memory (ROM). Where appropriate, the ROM may be a mask-programmed ROM, a programmable ROM (PROM), an erasable PROM (EPROM), an electrically erasable PROM (EEPROM), an electrically alterable ROM (EAROM), or a flash memory, or a combination of two or more of them.

The processor 901 may read and execute computer program instructions stored in the memory 902, to implement the method for adjusting display panel brightness according to any of the above embodiments.

In an example, the device for adjusting display panel brightness may further include a communication interface 903 and a bus 910. As shown in FIG. 14, the processor 901, the memory 902 and the communication interface 903 are connected to and communicate with each other via the bus 910.

The communication interface 903 is primarily used for achieving communicating between various modules, apparatuses, units and/or devices in the embodiments of the present application.

The bus 910 may include hardware, software, or both, to couple components of the device for adjusting display panel brightness to one another. By way of example and not limitation, the bus may include an accelerated graphics port (AGP) or another graphics bus, an Enhanced Industry Standard Architecture (EISA) bus, a front end bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB), or another suitable bus, or a combination of two or more of them. The bus 910 may include one or more buses, as appropriate. Although embodiments of the present application describe and illustrate a particular bus, the present application contemplates any suitable bus or interconnect.

The device for adjusting display panel brightness may execute the method for adjusting display panel brightness provided by the embodiment of the present application, so as to implement the method for adjusting display panel brightness described in conjunction with FIG. 11.

Further, an embodiment of the present application provides a computer-readable storage medium, having a computer program stored thereon. The computer program, when executed by a processor, can implement the method for adjusting display panel brightness of the above embodiment and achieve the same technical effect, which will not be repeated herein in order to avoid repetition. The above-mentioned computer-readable storage medium may include a Read-Only Memory (ROM), a Random Access Memory (RAM), a magnetic disk or an optical disk, etc., which is not limited herein. An example of the computer readable storage medium may include a non-transitory machine readable medium, such as an electronic circuit, a semiconductor memory device, a flash memory, an erasable ROM (EROM), a floppy disk, a CD-ROM, an optical disk, a hard disk, etc.

The functional blocks shown in the structure diagrams described above may be implemented in hardware, software, firmware, or a combination thereof. When implemented in hardware, the functional blocks may be, for example, electronic circuits, Application Specific Integrated Circuits (ASICs), appropriate firmware, plug-ins, function cards, etc. When implemented in software, elements of the present application may be programs or code segments to perform the required tasks. The programs or code segments can be stored in a machine-readable medium or transmitted over a transmission medium or communication link by data signals carried in a carrier wave. A "computer-readable medium" can include any medium that can store or transmit information. An examples of the computer readable medium may include an electronic circuit, a semiconductor memory device, a ROM, a flash memory, an erasable ROM (EROM), a floppy diskette, a CD-ROM, an optical disk, a hard disk, a fiber optic medium, a radio frequency link, etc. The code segments may be downloaded via a computer network such as the Internet, an intranet, etc.

It should also be noted that the exemplary embodiments mentioned in the present application describe methods or systems based on a series of steps or apparatuses. However, the present application is not limited to the order of the above-mentioned steps, that is, the steps may be performed in the order mentioned in the embodiment, may be performed in an order different from that in the embodiment, or several of them may be performed simultaneously.

The embodiments of the present application as described above are not intended to be exhaustive or to limit the application to only the specific embodiments as described. Obviously, many modifications and variations are possible in light of the above description. The embodiments were chosen and described in the description in order to best explain the principles of the application and its practical applications, so as to enable those skilled in the art to best utilize the application and modifications on the basis of the application. The present application is limited only by the attached claims and the full scope and equivalents thereof.

What is claimed is:

1. A display panel comprising a first display area and a second display area, a pixel density of the first display area being less than a pixel density of the second display area, the display panel comprising:

a plurality of sub-pixels disposed in the first display area and the second display area;

a power supply unit comprising a power supply output terminal;

a plurality of first power supply lines electrically connected to the sub-pixels disposed in the first display area;

a plurality of second power supply lines electrically connected to the sub-pixels disposed in the second display area; and a voltage adjusting unit;

wherein first ends of the second power supply lines are electrically connected to the power supply output terminal, second ends of the second power supply lines are electrically connected to the first power supply lines via the voltage adjusting unit, and the voltage adjusting unit is configured to adjust a voltage on the first power supply lines.

2. The display panel according to claim 1, wherein the voltage adjusting unit comprises a driving module, a control terminal of the driving module is electrically connected to a control signal terminal, an input terminal of the driving module is electrically connected to the second ends of the second power supply lines, and an output terminal of the driving module is electrically connected to the first power supply lines.

3. The display panel according to claim 2, wherein the driving module comprises a first transistor, a gate electrode of the first transistor is electrically connected to the control signal terminal, a first electrode of the first transistor is electrically connected to the second ends of the second power supply lines, and a second electrode of the first transistor is electrically connected to the first power supply lines.

4. The display panel according to claim 2, wherein the voltage adjusting unit further comprises a first control signal writing module and a first storage module;

the first control signal writing module is electrically connected to the control terminal of the driving module and the control signal terminal, and configured to write a control signal of the control signal terminal into the control terminal of the driving module; and the first storage module is electrically connected to the control terminal of the driving module, and configured to maintain potential of the control terminal of the driving module.

5. The display panel according to claim 4, wherein the driving module comprises a second transistor, the first control signal writing module comprises a third transistor, and the first storage module comprises a first capacitor; wherein a first electrode of the second transistor is electrically connected to the second ends of the second power supply lines, and a second electrode of the second transistor is electrically connected to the first power supply lines;

a gate electrode of the third transistor is electrically connected to a scanning signal terminal, a first electrode of the third transistor is electrically connected to the control signal terminal, and a second electrode of the third transistor is electrically connected to a gate electrode of the second transistor; and a first pole of the first capacitor is electrically connected to the second ends of the second power supply lines, and a second pole of the first capacitor is electrically connected to the gate electrode of the second transistor.

6. The display panel according to claim 2, wherein the voltage adjusting unit further comprises a second control signal writing module, a compensation module, an initialization module and a second storage module;

the second control signal writing module is electrically connected to the input terminal of the driving module and the control signal terminal, and configured to write a control signal of the control signal terminal into the control terminal of the driving module;

the compensation module is electrically connected to the output terminal and the control terminal of the driving module, and configured to detect and self-compensate a threshold voltage deviation in the driving module;

the initialization module is electrically connected to the control terminal of the driving module and a reference signal terminal, and configured to initialize the control terminal of the driving module; and the second storage module is electrically connected to the control terminal of the driving module, and configured to maintain potential of the control terminal of the driving module.

7. The display panel according to claim 6, wherein the driving module comprises a fourth transistor, the second control signal writing module comprises a fifth transistor, the compensation module comprises a sixth transistor, the initialization module comprises a seventh transistor, and the second storage module comprises a second capacitor;

a first electrode of the fourth transistor is electrically connected to the second ends of the second power supply lines, and a second electrode of the fourth transistor is electrically connected to the first power supply lines;

a gate electrode of the fifth transistor is electrically connected to a second scanning signal terminal, a first electrode of the fifth transistor is electrically connected to the control signal terminal, and a second electrode of the fifth transistor is electrically connected to the first electrode of the fourth transistor;

a gate electrode of the sixth transistor is electrically connected to the second scanning signal terminal, a first electrode of the sixth transistor is electrically connected to the second electrode of the fourth transistor, and a second electrode of the sixth transistor is electrically connected to the gate electrode of the fourth transistor;

a gate electrode of the seventh transistor is electrically connected to a first scanning signal terminal, a first electrode of the seventh transistor is electrically connected to the reference signal terminal, and a second electrode of the seventh transistor is electrically connected to the gate electrode of the fourth transistor; and a first pole of the second capacitor is electrically connected to the second ends of the second power supply lines, and a second pole of the second capacitor is electrically connected to the gate electrode of the fourth transistor.

8. The display panel according to claim 2, wherein the driving module comprises a driving transistor with an on-state current larger than a maximum light-emitting current of the first display area.

9. A method for adjusting display panel brightness, used to determine a voltage value of a control signal of the control signal terminal of the display panel according to claim 2, the method comprising:

setting the control signal of the control signal terminal to have an initial voltage value, and performing gamma debugging on the display panel to keep brightness consistency of the first display area and the second display area in white pictures at respective gray levels;

at the initial voltage value, displaying a monochrome picture of a first gray level on both the first display area and the second display area, and judging whether a brightness difference between the first display area and the second display area is within a first preset range;

under a condition that the brightness difference between the first display area and the second display area is beyond the first preset range, adjusting the initial voltage value to obtain a first voltage value, at which the brightness difference between the first display area and the second display area is within the first preset range; and taking the first voltage value as the voltage value of the control signal of the control signal terminal when both the first display area and the second display area display the monochrome picture of the first gray level.

10. The method for adjusting display panel brightness according to claim 9, wherein the method further comprises:

at the initial voltage value, displaying the monochrome picture of the first gray level on the second display area and a monochrome picture of a second gray level on the first display area, and judging whether a difference between a brightness value of the first display area and a target brightness value is within a second preset range;

under a condition that the difference between the brightness value of the first display area and the target brightness value is beyond the second preset range, adjusting the initial voltage value to obtain a second voltage value, at which a difference between a measured brightness value of the first display area and the target brightness value is within the second preset range; and taking the second voltage value as the voltage value of the control signal of the control signal terminal when the second display area displays the monochrome picture of the first gray level and the first display area displays the monochrome picture of the second gray level.

11. The method for adjusting display panel brightness according to claim 9, wherein the method further comprises:

dividing, according to a maximum voltage drop of the second power supply lines, a picture displayed on the second display area into a plurality of first levels and a picture displayed on the first display area into a plurality of second levels, wherein currents of the second display area at different ones of the first levels are different, and currents of the first display area at different ones of the second levels are different; and determining a corresponding relationship between the first and second levels and voltage values of the control signal of the control signal terminal.

12. The method for adjusting display panel brightness according to claim 11, wherein the method further comprises:

storing the corresponding relationship between the first and second levels and the voltage values of the control signal of the control signal terminal in a storage module of the display panel.

13. The display panel according to claim 1, wherein the first ends of the second power supply lines are close to the power supply unit and the second ends of the second power supply lines are far away from the power supply unit, the first end of each of the second power supply lines is connected to a first connecting line, the second end of each of the second power supply lines is connected to a second connecting line, the first connecting line is electrically connected to the power supply output terminal and the second connecting line is electrically connected to the voltage adjusting unit.

14. The display panel according to claim 1, wherein each of the first power supply lines is connected to a third connecting line, and two ends of the third connecting line are each connected to one voltage adjusting unit.

15. A display apparatus, comprising the display panel according to claim 1.

16. The display apparatus according to claim 15, wherein the voltage adjusting unit comprises a driving module, a control terminal of the driving module is electrically connected to a control signal terminal, an input terminal of the driving module is electrically connected to of the second power supply lines, and an output terminal of the driving module is electrically connected to the first power supply lines.

17. The display apparatus according to claim 16, wherein the driving module comprises a first transistor, a gate electrode of the first transistor is electrically connected to the control signal terminal, a first electrode of the first transistor is electrically connected to the second ends of the second power supply lines, and a second electrode of the first transistor is electrically connected to the first power supply lines.

18. The display apparatus according to claim 16, wherein the voltage adjusting unit further comprises a first control signal writing module and a first storage module;

the first control signal writing module is electrically connected to the control terminal of the driving module and the control signal terminal, and configured to write a control signal of the control signal terminal into the control terminal of the driving module; and the first storage module is electrically connected to the control terminal of the driving module, and configured to maintain potential of the control terminal of the driving module.

19. The display apparatus according to claim 18, wherein the driving module comprises a second transistor, the first control signal writing module comprises a third transistor, and the first storage module comprises a first capacitor; wherein a first electrode of the second transistor is electrically connected to the second ends of the second power supply lines, and a second electrode of the second transistor is electrically connected to the first power supply lines;

a gate electrode of the third transistor is electrically connected to a scanning signal terminal, a first electrode of the third transistor is electrically connected to the control signal terminal, and a second electrode of the third transistor is electrically connected to a gate electrode of the second transistor; and a first pole of the first capacitor is electrically connected to the second ends of the second power supply lines, and a second pole of the first capacitor is electrically connected to the gate electrode of the second transistor.

20. The display apparatus according to claim 16, wherein the voltage adjusting unit further comprises a second control signal writing module, a compensation module, an initialization module and a second storage module;

the second control signal writing module is electrically connected to the input terminal of the driving module and the control signal terminal, and configured to write a control signal of the control signal terminal into the control terminal of the driving module;

the compensation module is electrically connected to the output terminal and the control terminal of the driving module, and configured to detect and self-compensate a threshold voltage deviation in the driving module;

the initialization module is electrically connected to the control terminal of the driving module and a reference signal terminal, and configured to initialize the control terminal of the driving module; and the second storage module is electrically connected to the control terminal of the driving module, and configured to maintain potential of the control terminal of the driving module.

* * * * *